United States Patent [19]
Urban

[11] 3,764,653
[45] *Oct. 9, 1973

[54] CONTINUOUS PROCESS FOR SCRUBBING $SO_2$ FROM A GAS STREAM WITH $H_2$ REGENERATION

[75] Inventor: Peter Urban, Northbrook, Ill.
[73] Assignee: Universal Oil Products Company, Des Plaines, Ill.
[ * ] Notice: The portion of the term of this patent subsequent to Jan. 18, 1989, has been disclaimed.
[22] Filed: June 24, 1971
[21] Appl. No.: 156,183

Related U.S. Application Data
[63] Continuation-in-part of Ser. No. 68,274, Aug. 31, 1970.

[52] U.S. Cl.................. 423/242, 423/512, 423/514
[51] Int. Cl............................................ C01b 17/00
[58] Field of Search................ 23/25 Q, 115, 178 R, 23/181; 423/242, 512, 514

[56] References Cited
UNITED STATES PATENTS

| | | | |
|---|---|---|---|
| 3,635,820 | 1/1972 | Urban | 210/61 |
| 3,579,296 | 5/1971 | Cann | 23/178 |
| 2,862,789 | 12/1938 | Burgess | 23/178 |
| 3,644,087 | 2/1972 | Urban | 23/2.5 Q |

Primary Examiner—Oscar R. Vertiz
Assistant Examiner—Gregory A. Heller
Attorney—James R. Hoatson, Jr. et al.

[57] ABSTRACT

An input gas stream containing $SO_2$ is continuously treated in order to remove a substantial portion of the $SO_2$ therefrom by the steps of: (a) scrubbing the input gas stream with an aqueous absorbent stream containing an alkaline reagent; (b) treating the resulting rich absorbent stream with a reducing agent at conditions selected to convert the sulfite compound contained therein to the corresponding thiosulfate compound; (c) catalytically reacting the resulting thiosulfate compound with hydrogen at reduction conditions selected to produce the corresponding sulfide compound; (d) stripping hydrogen sulfide from the resulting solution to form a regenerated aqueous absorbent stream; and, thereafter, (e) passing at least a portion of the regenerated absorbent stream to the scrubbing step. The principal utility of this scrubbing process is associated with the problem of continuously removing a sulfur dioxide contaminant from the flue or stack gas streams such as are typically produced in modern electrical power generating stations in order to abate a serious pollution problem and to enable the safe, non-polluting burning of high sulfur fuels. Key features of this process are: the selective conversion of the sulfite compound obtained from the scrubbing step to the corresponding thiosulfate compound in the preliminary treatment step, the subsequent reduction of the thiosulfate compound to the corresponding sulfide compound in a highly efficient economic and selective manner, the minimization of undesired sulfate by-products during both of these conversion steps and the use of a relatively cheap, continuously regenerated absorbent which has a high capacity for $SO_2$ as well as a high efficiency for $SO_2$ removal.

24 Claims, 1 Drawing Figure

Figure 1:
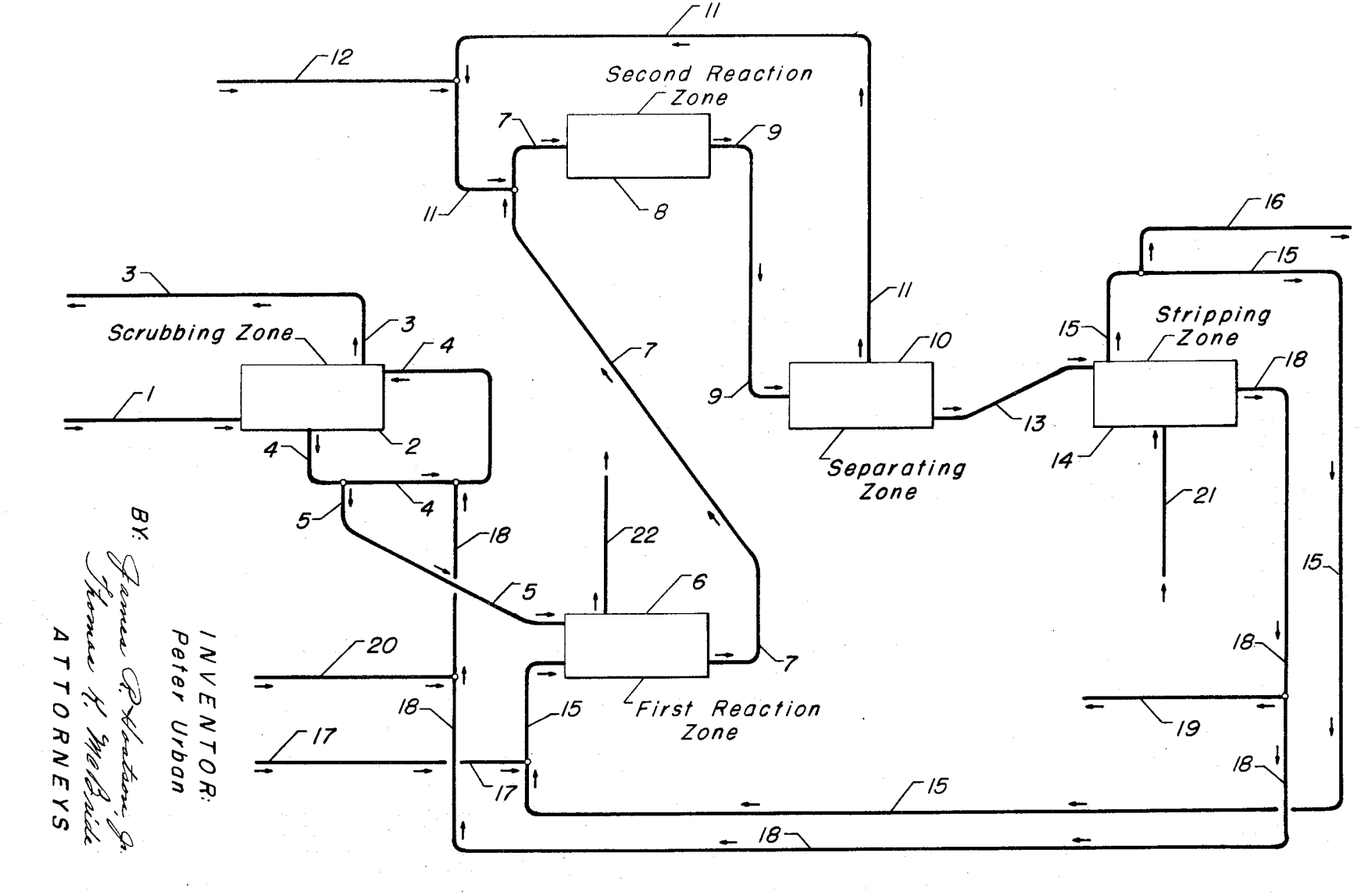

CONTINUOUS PROCESS FOR SCRUBBING $SO_2$ FROM A GAS STREAM WITH $H_2$ REGENERATION

CROSS REFERENCES TO RELATED APPLICATIONS

This application is a continuation-in-part of my prior, copending application entitled "TREATING A WATER STREAM CONTAINING A WATER-SOLUBLE SULFITE COMPOUND" which was filed Aug. 31, 1970 and assigned Ser. No. 68,274.

DISCLOSURE

The subject of the present invention is a novel, continuous process for the selective removal of $SO_2$ from a gas stream containing same. More precisely, the present invention involves an $SO_2$-scrubbing step operated with an aqueous absorbent containing an alkaline reagent coupled with a unique regeneration procedure which comprises: a preliminary treatment step wherein sulfite compound contained in the rich scrubbing solution are converted to the corresponding thiosulfate compound, a primary reduction step wherein the resulting thiosulfate compounds are catalytically converted to the corresponding sulfide compound, and a stripping step wherein the absorbent solution is regenerated with liberation of hydrogen sulfide. In one important aspect, the present invention has to do with a scrubbing process which is operated with highly efficient aqueous absorbent comprising ammonium hydroxide and/or carbonate wherein the rich scrubbing solution withdrawn from the scrubbing step contains ammonium sulfite and/or ammonium bisulfite, wherein the preliminary treatment step involves selective conversion of the ammonium sulfite and/or ammonium bisulfite to ammonium thiosulfate, wherein the primary reduction step involves selective catalytic reduction with hydrogen of ammonium thiosulfate to ammonium sulfide and/or hydrosulfide and wherein $H_2S$ is stripped from the resulting solution with $CO_2$ to form the regenerated absorbent.

A major problem encountered in many areas of industry today is associated with the production of waste gas streams containing sulfur dioxide. The problem essentially involves the disposal of these waste gas streams without causing substantial air pollution. This problem is an extremely complex one because of the wide variety of industrial sources that emit these sulfur dioxide-containing gas streams. One of the more common sources is associated with the combustion of sulfur-containing fuels in boilers, internal combustion engines, heating units, etc., to produce flue or stack gas streams containing significant amounts of sulfur dioxide. Similarly, waste gas streams of this type are generally produced by other industrial processes such as the smelting of sulfur-bearing ores, the refining of coke, the production of sulfur in a Claus process, the production of paper via a wood pulping process and the like industrial processes. It is well known that the indiscriminate discharge of these gas streams into the atmosphere results in a substantial air pollution problem because the sulfur dioxide has extremely detrimental effects on animal and plant life. In addition, the discharge of these gas streams into the atmosphere constitutes a waste of a valuable material because the sulfur contained in same is an industrial commodity. Many processes have been proposed for removal of sulfur dioxide from these gas streams. A large percentage of these proposed removal procedures involve contacting the sulfur dioxide containing gas stream with an aqueous absorbent stream which typically contain materials which chemically or physically react with the sulfur dioxide in order to absorb same into the liquid solution. A widely studied procedure involves the use of a solution of an alkaline reagent such as ammonium hydroxide or carbonate, one of the alkali or alkaline earth metal salts such as sodium hydroxide or carbonate, potassium hydroxide or carbonate and the like alkaline reagents, to produce a rich absorbent stream containing the corresponding sulfite and/or bisulfite compound. For example, the use of an aqueous absorbent containing sodium bicarbonate and carbonate to form a rich scrubbing solution containing sodium sulfite and bisulfite.

Although the simple concept of the scrubbing $SO_2$ from the gas stream containing same with an aqueous absorbent containing an alkaline reagent has many advantages associated with it such as simplicity, high effectiveness and versatility, wide spread adoption of this type of solution to the $SO_2$ pollution problem has been inhibited by the lack of a regeneration procedure for the rich absorbent stream which can continuously regenerate the rich absorbent stream by selectively and economically converting the absorbed $SO_2$ to a conveniently handled and saleable product in a highly selected manner. That is, it is required that the regeneration procedure enable the operation of the scrubbing system in a closed-loop manner with respect to the absorbent. In particular, it is required that an acceptable regeneration procedure have the capability of not only continuously producing a regenerated absorbent stream but also minimizing undesired by-products so as to prevent the buildup of undesired intractable, difficultly removed ingredients in the absorbent stream once the system is operated in a closed-loop fashion. The by-product that is of the greatest concern in this regard is sulfate — for example, in a system using an aqueous solution of ammonium hydroxide or ammonium carbonate as the absorbent, ammonium sulfate and bisulfate salts once formed in the system can present serious problems if special means are not provided to remove them or their production is not suppressed. Specifically, these salts can build up until finely divided solids are formed which then can cause corrosion, erosion and fouling problems.

One solution that has been proposed to the problem of regenerating the rich absorbent streams of the types discussed above is the use of the suitable reducing agent to react with the sulfite compounds contained therein in order to selectively produce elemental sulfur and/or the corresponding sulfide compound. However, despite stringent precautions, when common reducing agents such as hydrogen, a suitable sulfide compound, or carbon monoxide are used in an attempt to directly reduce these sulfite compounds to elemental sulfur or the corresponding sulfide compounds, undesired sulfate compounds are formed in unacceptable amounts. These sulfate compounds are believed to be caused by the sulfite compounds undergoing auto-oxidation-reduction at the conditions necessary for direct reduction.

The problem addressed by the present invention is, therefore, to provide a flue gas scrubbing system which is capable of continuous operation with a closed-loop absorbent circuit, which can selectively produce an easily removed substance as the principal product of the regeneration section and which can minimize the amount of undesired sulfate by-products formed in the regeneration section.

I have now found a combination process for continuously scrubbing $SO_2$ from a gas stream which utilizes a conventional aqueous absorbent stream in a closed-loop fashion and which comprises a wet scrubbing step coupled with a novel regeneration procedure which enables the recovery of hydrogen sulfide in high yield, minimizes undesired sulfate by-products from the regeneration section and produces a regenerated absorbent stream which is of a relatively low total sulfur content and, consequently, possesses a high capacity for $SO_2$ removal. The concept of the present invention is based on my finding that the sulfite compound contained in the rich scrubbing solution withdrawn from the scrubbing step can be easily converted at relatively low severity conditions to the corresponding thiosulfate compound in the highly selective manner without forming any substantially amounts of undesired, intractable sulfate compounds. Coupled with the finding is my additional observation that the thiosulfate compound can be catalytically reduced by hydrogen in a highly selective, economic and efficient manner to form the corresponding sulfide compound from which hydrogen sulfide can be easily recovered. Thus the central point of the present process involves using a conventional scrubbing procedure coupled with a regeneration procedure wherein thiosulfate is used as an intermediate in a multi-step operation designed to convert the sulfite compound contained in the rich absorbent stream to hydrogen sulfide, rather than an attempt to directly reduce the sulfite compound to sulfide in a single step operation. This sulfite-to-thiosulfate-to-sulfide route provides a regeneration procedure which facilitates careful control of by-product formation during the regeneration operation and enables the production of a regenerated absorbent stream which can be directly recycled to the scrubbing step, thereby allowing the system to be operated in the closed loop fashion with respect to the absorbent stream.

It is accordingly, an object of the present invention to provide a simple, effective, efficient, and selective procedure for treating a gas stream containing $SO_2$ which process can selectively produce hydrogen sulfide and operate with a continuous closed-loop circuit of absorbent between the scrubbing section and the regeneration section. Another object is to minimize the amount of undesired, intractable by-products formed in the regeneration section of such a procedure. Another object is to provide a regeneration procedure for an $SO_2$-scrubbing step that maximizes the sulfur differential across the regeneration procedure, thereby increasing the capacity and efficiency of the regenerated absorbent.

In brief summary, one embodiment of the present invention is a process for treating an input gas stream containing $SO_2$ in order to continuously remove a substantial portion of the $SO_2$ therefrom. The first step is a scrubbing step wherein the input gas stream is contacted in a suitable liquid-gas contacting zone with an aqueous absorbent stream containing an alkaline reagent at scrubbing condition selected to result in a treated gas stream containing a substantially reduced amount of $SO_2$ and in an effluent water stream containing a water-soluble sulfite compound. The next step is a preliminary treatment step which involves contacting at least a portion of the effluent stream from the scrubbing step with a reducing agent, selected from the group consisting of finely divided sulfur, a polysulfide compound, a water-soluble sulfide compound and mixtures thereof, at thiosulfate production conditions selected to form an effluent stream containing a thiosulfate compound. Thereafter, the effluent stream from the preliminary treatment step is catalytically reacted with hydrogen in th primary reduction step at reduction conditions selected to produce a sulfide-containing aqueous effluent stream. The next step is a separating or stripping step wherein hydrogen sulfide is separated or stripped from the aqueous effluent stream from the primary reduction step to produce a hydrogen sulfide-containing overhead stream and regenerated aqueous absorbent stream. In the final step, at least a portion of the resulting regenerated aqueous absorbent stream is passed to the scrubbing step, thereby providing a closed-loop flow circuit of absorbent.

In another embodiment, the invention is a process as outlined about in the first embodiment wherein the alkaline reagent utilized in the aqueous absorbent stream is selected from the group consisting of the salts of ammonia, the alkali metals and the alkaline earth metals which hydrolize in water to form a basic solution — for example, the hydroxide and carbonate salts.

In a more specific embodiment, the present invention is a process for treating a gas stream containing $SO_2$ in order to remove a substantial portion of the $SO_2$ therefrom. The first step in this embodiment involves a scrubbing step in which the input gas stream is contacted with an aqueous absorbent containing ammonium hydroxide or carbonate or bicarbonate at scrubbing conditions selected to form a treated gas stream containing a substantially reduced amount of $SO_2$ and an effluent water stream containing ammonium sulfite or bisulfite. At least a portion of the effluent water stream from the scrubbing step is thereafter contacted in a preliminary treatment step, with a reducing agent, selected from the group consisting of finely divided sulfur, a polyslfide, a water-soluble sulfide compound and mixtures thereof, at thiosulfate production conditions selected to result in an effluent stream containing ammonium thiosulfate. The primary reduction step then involves catalytically reacting the effluent stream from the preliminary treatment step with hydrogen stream at reduction conditions selected to produce an aqueous effluent stream containing ammonium sulfide or hydrosulfide. The aqueous effluent stream from this primary reduction step is thereafter subjected to contact with stripping gas at stripping conditions effective to produce a regenerated aqueous absorbent stream containing ammonium hydroxide or bicarbonate or carbonate and an overhead gaseous stream containing hydrogen sulfide. At least a portion of the resulting regenerated absorbent stream is then in the final step, passed to the scrubbing step, thereby providing a closed-loop flow circuit absorbent.

In another embodiment, the present invention is a process as described above in the last embodiment wherein the reducing agent utilized in the preliminary treatment step is hydrogen sulfide and wherein at least a portion of the overhead stream produced in the stripping step is passed to the preliminary treatment step in order to supply a portion of the hydrogen sulfide reactant utilized therein.

Yet another embodiment of the present invention involves a process as outlined above in the first embodiment wherein the primary reduction step is performed in the presence of a catalyst comprising a catalytically effective amount of a metallic component selected from the group consisting of the transition elements of groups VI and VIII of the Periodic Table, and compounds thereof, combined with a porous carrier material.

Other objects and embodiments of the present invention are hereinafter disclosed in the following detailed discussion of the input streams, the preferred conditions, the preferred reactants, the output streams and mechanics associated with each of the essential and preferred steps of the present invention.

The starting point for the subject process is a scrubbing step wherein an input gas stream containing $SO_2$ is contacted in a suitable gas-liquid contacting means with an aqueous absorbent stream containing an alkaline reagent. As previously explained, the input gas stream passed to this step is typically a flue or stack gas. For example, a typical stack gas stream containing about 1 to about 10 percent $O_2$, about 5 to 15 percent or more $CO_2$, about 3 to about 10 percent or more $H_2O$, about 0.01 to about 1 percent or more $SO_2$. In many cases, the input gas stream will also contain carbon monoxide, oxide of nitrogen, entrained fly ash and the other well known ingredients for flue gas streams. The amount of $SO_2$ contained in this input gas stream can vary over a wide range; namely from about 0.01 to about 1 mole percent or more, with a more typical amount being about 0.05 to about 0.5 mole percent. In many cases, this input gas stream is available at a relatively high temperature of about 200° to about 500° F. or more, and since it is preferred that the temperature of the input gas stream be at a relatively low level because this increases the capacity of the absorbent solution, it is often advantageous to cool the input gas stream by any suitable means such as by presaturating it with water under adibatic conditions.

The aqueous absorbent stream utilized in this scrubbing step is generally characterized as an aqueous solution of a suitable watersoluble alkaline reagent which reacts with water to give a basic solution such as ammonium hydroxide, ammonium carbonate and bicarbonate, the alkali metal hydroxides, the alkali metal carbonates and bicarbonates and the water-soluble alkaline earth metal hydroxide, carbonates and bicarbonates, and the like alkaline reagents. Of the alkali metal reagents, sodium hydroxide, sodium carbonate, sodium bicarbonate, potassium hydroxide, potassium carbonate, potassium bicarbonate are particularly preferred. In most cases, excellent results are obtained when the alkaline reagent is ammonium hydroxide or ammonium carbonate or ammonium bicarbonate. It is to be noted that it is within the purview of the present invention to use a mixture of the alkaline reagents previously mentioned. Since it is also contemplated that the scrubbing step can be operated with the absorbent continuously cycling around the scrubbing means, it is possible that absorbent could accumulate substantial amounts of sulfite and bisulfite compounds. In this last case, only a small portion of the rich effluent stream from the scrubbing step would be sent to the regeneration section of the process, and the major portion of the rich absorbent withdrawn from the scrubbing step would be commingled with the regenerated absorbent stream and recycled to the scrubbing step.

The amount of alkaline reagent contained in the scrubbing solution is subject to some choice depending upon the specific requirements associated with the particular gas stream being treated; ordinarily, acceptable results are obtained when the alkaline reagent comprises about 1 to about 50 wt. percent of the absorbent solution, and more preferably to 1 to about 15 wt. percent. Of course, absorbent solutions containing an amount of the alkaline reagent up to the solubility limit of the particular alkaline reagent selected at the conditions maintained in the scrubbing step can be utilized if desired. In the case where the absorbent is continuously cycled around the scrubbing step and only a drag stream drawn off for regeneration, the total amount of the alkaline reagent contained in the solution (i.e., fresh and spent) can reach rather high levels; for example, it can easily constitute 30 to 50 wt. percent of the absorbent solutions.

This scrubbing step can be carried out in a conventional scrubbing zone in any suitable manner including multiple stages. The scrubbing solution can be passed into the scrubbing zone in either upward or downward flow and the input gas stream can be simultaneously introduced into the scrubbing zone in concurrent flow relative to the scrubbing solution. A particularly preferred procedure involves downward flow of the scrubbing solution with countercurrent flow of the gas stream which is to be treated. The scrubbing zone is preferably a conventional gas-liquid contacting zone containing suitable means for effecting intimate contact between a descending liquid stream and an ascending gas stream. Suitable contacting means include bubble trays, baffles, and any of the various packing materials known to those skilled in the art. In this countercurrent mode of operation, a treated gas stream is withdrawn from the upper region of the scrubbing zone and a rich absorbent solution is withdrawn from the lower region thereof. For the class of alkaline reagents of concern here, the rich absorbent solution will contain substantial amounts of a water-soluble sulfite compound such as ammonium sulfite and/or bisulfite, sodium sulfite and/or bisulfite and the like. As indicated previously, according to one mode of operation of the scrubbing step, only a drag stream from the rich absorbent withdrawn from the step is sent to the regeneration section of the process; the rest is cycled around the scrubbing step. The drag system is ordinarily withdrawn at a rate at least sufficient to continuously remove the net sulfur taken up in the scrubbing step.

This scrubbing step is generally conducted under conventional scrubbing conditions which are selected on the basis of the characteristics of the specific alkaline reagent utilized, the sulfur dioxide content of the input gas stream, the portion of the sulfur dioxide that is to be removed in the scrubbing step, and the physical properties of the scrubbing zone. Ordinarily, the scrubbing step is preferably operated at a relatively low temperature of about 10° to 100° C., a relatively low pressure which typically approximates atmospheric (although better results are obtained at higher pressures) a volume ratio of input gas streams to scrubbing solution of about 100:1 to about 10,000:1 and a pH of about 4 to 7 or more. When the input gas stream is a flue or stack gas stream, means must ordinarily be provided for cooling the input gas stream to a relatively low temperature before it is introduced into the scrubbing step. Likewise, since the typical operation of the scrubbing step involves the handling of large volumes of gas containing only a relatively small amount of sulfur dioxide, it is preferred that the pressure drop through the scrubbing zone be held to a minimum so as to avoid the necessity of compressing large volumes of gas to overcome the pressure drop within the scrubbing zone.

Following the scrubbing step, the next step of the present process is the preliminary treatment step and it involves the conversion, in the highly selective manner, of the sulfite or bisulfite compound contained in at least a portion of the effluent water stream withdrawn from the scrubbing step, to the corresponding thiosulfate compound. Ordinarily the sulfite or bisulfite compound is contained in the feed stream to this step in an amount of about 0.01 wt. percent, calculated on an equivalent sulfur basis, up to the solubility limit of the particular sulfite compound in water at the conditions utilized in the scrubbing step; for example, the feed stream to this step can contain about 1 to about 20 wt. percent or more sulfur as ammonium sulfite and/or bisulfite. According to the present invention, this step involves a reaction between the sulfite compound contained in this rich absorbent stream and a special type of reducing agent. This reducing agent is selected from the group consisting of finely divided sulfur, a polysulfide compound, a water-soluble sulfide copmound and mixtures thereof. In the first mode of operation of this step, finely divided sulfur is utilized as the reducing agent, and it is preferred that the sulfur be present in particle size of about 10 to about 250 microns, with best results obtained with particles of about 25 to about 100 microns. Typically, it is a good practice to introduce the sulfur into this step via a water stream containing a slurry of finely divided sulfur in an amount of about 1 to about 75 wt. percent thereof, although many other suitable means for injecting finely divided solid particles can be utilized if desired. In this first mode of operation, it is preferred to also utilize a wetting agent in the reaction mixture in order to facilitate good contact of the elemental sulfur with the sulfite compound. Suitable wetting agents are: the salts of alkyl aryl sulfonates such as the sodium salt of dodecylbenzene sulfonate; sulfonated fatty acid esters; $C_{12}$ to $C_{16}$ alkyl sulfates; $C_{12}$ to $C_{16}$ alkyl sulfonates; alkyl polyoxyethylene alcohols; ethylene oxide condensations products of alkyl phenols; quaternary ammonium salts such as octadecyldimethylbenzyl ammonium chloride and the like wetting agents. The wetting agent is preferably utilized in a relatively small amount corresponding to about 0.01 to about 1 wt. percent of the sulfite compound that is reacted. The amount of elemental sulfur utilized in this mode of operation of the preliminary treatment step should be sufficient to supply one atom of sulfur per molecule of sulfite compound contained in the input water stream, with the preferred amount corresponding to about 1 to about 3 atoms of sulfur per mole of sulfite compound.

In a second mode of operation for this preliminary treatment step, the reducing agent is a polysulfide compound. Suitable polysulfide compounds include the ammonium, alkali metal, and alkaline earth polysulfides. Best results are ordinarily obtained with ammonium or sodium polysulfide. The polysulfide compound is ordinarily charged to this step in the form of an aqueous solution containing about 1 to about 50 wt. percent of the polysulfide compound. It is to be noted that when the reducing agent is a polysulfide copound, no wetting agent is necessary in order to achieve good contact with the sulfite compound. The amount of the polysulfide compound charged to this step is preferably sufficient to provide at least the stoichiometric amount necessary for the reaction between it and the sulfite compound to produce the corresponding thiosulfate compound. In the typical case where the polysulfite compound contains four atoms of elemental sulfur and one atom of sulfide (e.g. $(NH_4)_2S_5$), the stoichiometric amount is 1/6 moles of polysulfide per mole of sulfite compound, with a preferred value being about ¼ to about ¾ or more moles of polysulfide per mole of sulfite compound.

In a third mode of operation of this preliminary treatment step, the reducing agent is a water-soluble sulfide compound. Suitable water-soluble sulfide compounds are hydrogen sulfide, ammonium sulfide, ammonium hydrosulfide and the sulfides and hydrosulfides salts of the alkali and alkaline earth metals. Best results are ordinarily obtained in this mode of operation of this step when the sulfide reactant is hydrogen sulfide or ammonium hydrosulfide. The amount of this sulfide reactant utilized in this step is at least sufficient to provide 0.5 moles of sulfide compound per mole of sulfite compound contained in the input water stream, with best results obtained at a mole ratio corresponding to about 0.6 to about 1.5 or more. Likewise, in this third mode of operation, good results are ordinarily obtained when the pH of the input water stream is in the range of 4 to about 7.

Conditions utilized in this preliminary treatment step can be generally described as thiosulfate production conditions and comprise: a temperature of about 20° to about 150° C., a pressure sufficient to maintain the input water stream in the liquid phase and a contact time corresponding to about 0.05 to 1 or more hours. In general, the contact time necessary for the desired reaction is a function of the reducing agent utilized, with relatively short contact times of about 1 to 10 minutes being sufficient in the case where the reducing agent is a sulfide or a polysulfide compound. The other reducing agents require a relatively longer contact time ranging up to about 0.1 to about 1 hour. Considering all of the factors involved in the operation of this preliminary treatment step, best results are ordinarily obtained when the reducing agent is a sulfide compound such as hydrogen sulfide or a polysulfide compound, particularly sodium or ammonium polysulfide.

Following this preliminary treatment step, an aqueous effluent stream containing relatively large amounts of a thiosulfate compound is withdrawn therefrom and passed to the primary reduction step of the present process wherein it is catalytically treated with hydrogen at reduction conditions selected to produce the corresponding sulfide compound. This reduction step is effected by contacting the aqueous effluent stream and hydrogen stream with a suitable reduction catalyst at reduction conditions selected to reduce the thiosulfate compound contained in this effluent stream to the corresponding sulfide compound and $H_2O$.

This primary reduction step can be carried out in any suitable manner taught in the art for contacting a liquid stream and a gas stream with a solid catalyst. A particularly preferred method involves a fixed-bed catalyst system in which the catalyst is disposed in the reduction zone and the thiosulfate-containing aqueous solution is passed therethrough in either upward, radial, or downward flow with a hydrogen stream being simultaneously introduced in either countercurrent or concurrent flow relative to the aqueous stream. In particular, a preferred embodiment involves downflow and concurrent flow of the aqueous stream and the hydrogen stream through the reduction zone.

This reduction step can, moreover, be carried out with any suitable reduction catalyst known to be capable of reducing a thiosulfate compound to the corresponding sulfide compound. Based on my investigations I have determined that particularly good results are obtained with a catalyst comprising a catalytically effective amount of a metallic component selected from the group consisting of the transition metals of groups VI and VIII such as chromium, molybdenum, tungsten, iron, cobalt, nickel, platinum, palladium, etc. combined with a suitable carrier material. More specifically, preferred catalysts for the desired reduction reaction comprise a combination of a catalytically effective amount of a group VI or a group VIII transition metal component with a suitable porous support such as alumina or activated carbon. Of the transition metals, the ones best suited for the present process are the iron group metals of group VIII; specifically, iron, cobalt, nickel and compounds thereof. Particularly preferred embodiments of the present method involve the use of catalysts in which the metallic component is present in the form of a metallic sulfide such as cobalt sulfide, iron sulfide, nickel sulfide, molybdenum sulfide, or tungsten sulfide combined with a carrier material. The preferred carrier materials are activated carbons or charcoals such as those commercially available under the trade names of Norite, Nuchar, Darco and other similar products. In addition, conventional natural or synthetic highly porous inorganic refractory oxide carrier materials may be used as the support for the metallic component such as alumina, silica zirconia, silica-alumina, bauxite, clay, etc. Best results are ordinarily obtained with a catalyst comprising an iron group metallic component combined with relatively small particles of a suitable solid carrier material. That is, exceptionally good results are obtained with a catalyst having a metallic component selected from the compound and metals of iron, cobalt and nickel, with the oxides and sulfides of these metals being especially preferred. Excellent results are obtained when the reduction catalyst is a catalytically effective amount of cobalt sulfide combined with a suitable refractory inorganic oxide carrier material such as alumina, or cobalt sulfide combined with activated carbon.

An acceptable method for making this reduction catalyst comprises impregnating the carrier material with an aqueous solution of a soluble salt of the metallic component such as the acetate salt, the chloride salts, the nitrate salts, etc. The metallic component of the resulting composite can then be converted to the sulfide by treatment with hydrogen sulfide preferably at room temperature. The resulting sulfided composite is thereafter washed with an aqueous and/or ammoniacal solution and dried. In the case where the carrier material is a refractory inorganic oxide, it may be advantageous to calcine or oxidize the impregnated carrier material at a relatively high temperature to obtain a distribution of the metallic component on the carrier material which can thereafter be sulfided with a suitable sulfur compound in order to obtain the desired catalyst.

In general, the metallic component is preferably combined with the carrier material in an amount sufficient to result in the reduction catalyst containing about 0.1 to about 25 wt. percent of the metallic component, calculated as the elemental metal. For the preferred cobalt sulfide catalyst, the amount of cobalt incorporated is preferably in an amount sufficient to result in a reduction catalyst containing about 1 to about 10 wt. percent cobalt.

An essential reactant for the primary reduction step is hydrogen. The hydrogen stream charged to the primary reduction step may be substantially pure hydrogen or a mixture of hydrogen with other relatively inert gases, such as a mixture of hydrogen with $C_1$ to $C_4$ hydrocarbons, a mixture of hydrogen and nitrogen, a mixture of hydrogen and carbon dioxide, a mixture of hydrogen and hydrogen sulfide, etc. The excess recycle gas obtained from various petroleum processes which have a net hydrogen make, such as a reforming process, a dehydrogenation process, etc., may also be used if desired. It is preferred that the hydrogen be utilized in an amount equivalent to or greater than the stoichiometric amount required for the reduction of thiosulfate to sulfide. The stoichiometric amount is 4 moles of hydrogen per mole of thiosulfate. In general, it is preferred to operate at a hydrogen to thiosulfate mole ratio substantially greater than this stoichiometric amount. Hence, about 4 to about 100 moles of hydrogen per mole of the thiosulfate compound contained in the aqueous stream charged to the reduction step is preferably used, with best results obtained at a mole ratio of about 20:1 to about 50:1. It is understood that any unreacted hydrogen may be recovered from the effluent from this reduction step and then can be recycled, if desired, through suitable compressive means to supply at least a portion of the necessary hydrogen for the reduction step as is shown in the attached drawing.

The conditions utilized in this primary reduction step are generally described as reduction conditions effecting conversion of thiosulfate to sulfide. The temperature utilized is preferably selected from the range of about 125° to about 350° C. The pressure employed is typically a pressure which is sufficient to maintain the aqueous stream containing the thiosulfate compound in liquid phase. In general, it is preferred to operate at superatmospheric pressures and preferably a pressure of about 100 to about 3,000 psig. Moreover, it is preferred to use a liquid hourly space velocity (defined on the basis of the volume charge rate of the aqueous stream divided by the total volume of the reduction catalyst within the reduction zone) ranging from about 0.5 to about 10 hr.$^{-1}$, with best results obtained at about 1 to about 3 hr.$^{-1}$.

In a preferred embodiment of the primary reduction step wherein the aqueous stream containing the thiosulfate compound and the hydrogen stream are concurrently contacted with the reduction catalyst, the effluent stream withdrawn from the reduction zone contains the sulfide product of the reduction reaction, a very minor amount of unreacted thiosulfate, hydrogen water and the alkaline reagent. For example in the case where the aqueous stream contains ammonium thiosulfate, the sulfide product of reduction reaction is typically present as ammonium hydrosulfide or as hydrogen sulfide or a mixture of these, with the amount of ammonium hydrosulfide present therein depending primarily upon the amount of ammonia present in the influent to the reduction step. Unreacted hydrogen is typically separated from the aqueous effluent stream from the reduction step in a separating zone and recycled to the reduction zone.

In the next step of the present invention the aqueous effluent stream recovered from the primary reduction step is subjected to a stripping step designed to liberate hydrogen sulfide therefrom. Although any suitable stripping gas can be utilized including steam, nitrogen, air and the like, carbon dioxide is particularly preferred, because it acts to decrease the pH of the solution and form the corresponding carbonate salt. For instance, in the case where the effluent stream from the primary reduction step contains ammonium hydrosulfide, stripping with carbon dioxide liberates hydrogen sulfide and produces a regenerated absorbent stream containing ammonium carbonate. In another mode of operation of this step, the effluent water stream from the primary reduction step can be subjected to conditions sufficient to decompose the sulfide compound contained in this stream. For example, in the typical case where this water stream contains ammonium hydrosulfide, acceptable decomposition conditions are a temperature of about 100° to 200° C., and a pressure of about 1 to about 75 psig. Typically this decomposition mode of operation is contacted in a conventional distillation zone wherein upflowing vapors are generated by supplying heat to the bottom of same by means such as a steam coil or conventional reboiler and water injection into the top of the decomposition column is used to present $NH_3$ carryover. Regardless of which mode of operation is employed in this $H_2S$-stripping step, an overhead stream containing hydrogen sulfide will be produced. Likewise, a regenerated aqueous absorbent stream which is substantially reduced in total sulfur content will be recovered therefrom as a bottom stream.

This regenerated aqueous absorbent stream is substantially reduced in total sulfur content relative to the input rich absorbent stream and usually will contain less than 10 percent of the amount of sulfur contained in the input absorbent stream. In the case where the carbon dioxide is utilized in the stripping step as the stripping medium, this regenerated absorbent stream will contain substantial amounts of the carbonate or bicarbonate salt of the alkaline reagent originally present in the input absorbent stream — for example in the case where the alkaline reagent is ammonia, the regenerated absorbent stream will contain ammonium carbonate and/or bicarbonate, and in the case where the alkaline reagent is sodium hydroxide or carbonate the treated water stream will contain sodium carbonate and/or bicarbonate.

In accordance with the instant process, at least a portion of the regenerated absorbent stream is passed or recycled to the scrubbing step. In a preferred embodiment of the instant process, a portion of the hyrogen sulfide-containing overhead stream produced in the stripping step is passed to the preliminary treatment step in order to supply at least a portion of the reducing agent used therein. The remaining portion of this hydrogen sulfide-containing stream is then recovered as one of the product streams from the instant process. The hydrogen sulfide contained in this product stream can be converted to elemental sulfur by any suitable oxidation procedure such as a conventional Claus process or to sulfuric acid or used per se.

Having broadly characterized the essential steps comprising the present process, reference is now made to the attached drawing for a detailed explanation of a working example of a preferred flow scheme for the present invention. The attached drawing is merely intended as a general representation of the flow scheme involved with no intention to give details about heaters, pumps, valves,and the like equipment except where a knowledge of these devices is essential to an understanding of the present invention or would not be self-evident to those skilled in the relevant art.

Referring now to the attached drawing, a flue gas stream enters the system via line 1 and is passed into the lower region of a conventional liquid-gas scrubbing means, zone 2. In this zone it is passed in countercurrent flow to a descending stream of absorbent solution which enters the upper region of zone 2 via line 4. The input gas stream contains about 5 percent $O_2$, 12 percent $CO_2$, 6 percent $H_2O$, 76.8 percent $N_2$ and 0.2 percent $SO_2$. Zone 2 is a conventional-gas liquid contacting zone fitted with conventional means such as baffles, trays, packing material and the like, for effecting intimate contact between an ascending gas stream and a descending liquid stream. The resulting treated gas stream is withdrawn from zone 2 via line 3.

Also introduced into zone 2 is a liquid stream comprising the aqueous absorbent solution. It enters zone 2 via line 4 and is made up of two separate streams, on of which is a regenerated absorbent stream obtained from the regeneration section of the present system and the second of which is a major portion of the rich absorbent stream withdrawn from the lower region of zone 2 via line 4. The alkaline reagent utilized in this absorbent stream is primarily ammonium carbonate with a minor amount of ammonium bicarbonate.

According to the mode of operation of zone 2 shown in the drawing, the rich absorbent stream is withdrawn from the bototm of zone 2 via line 4 and a major portion of this stream is continuously cycled around zone 2 in order to allow the concentration of sulfite salts in the absorbent stream to build to relatively high levels. This procedure increases the capacity of the absorbent and minimizes the amount of the absorbent stream that must be cycled through the regeneration section of the system. The absorbent stream introduced into scrubber 2 via line 4 will accordingly contain a substantial amount of sulfite salts along with the alkaline reagent. Ordinarily, zone 2 is operated by monitoring the pH of the absorbent stream at the inlet to zone 2 and controlling the amount of the rich absorbent stream diverted to the regeneration section of the system at the junction of line 4 and 5 in response to a decrease in pH level. The preferred pH range is about 4 to about 7 or more, with best results ordinarily obtained in the range of about 5 to 7. With the system operating so that the absorbent stream introduced into zone 2 via line 4 is maintained at a pH level within this range, the rich absorbent stream withdrawn continuously from zone 2 via line 4 can typically contain about 1 to about 15 or more wt. percent sulfur principally as a mixture of ammonium sulfite and ammonium bisulfite. In addition, minor amounts of ammonium sulfate and thiosulfate are formed in zone 2. In the particular case shown in the drawing, the rich absorbent preferably contains about 8 wt. percent sulfur as ammonium sulfite and bisulfite.

Zone 2 is operated at a temperature of about 50° C., a pressure of about atmospheric and a gas to absorbent volume ratio of about 500:1. At these conditions, the treated gas stream withdrawn from the upper region of zone 2 via line 3 is found to contain less than 5 percent of the $SO_2$ originally present in the input gas stream.

As previously explained, the rich absorbent stream withdrawn from the lower region of zone 2 via line 4 is divided into two portions at the junction of line 5 with line 4. The major portion continues on via line 4 and is admixed with regenerated absorbent at the junction of line 18 with line 4. The resulting mixture of cycled and regenerated absorbent is then reintroduced into zone 2 via line 4. The minor portion of the rich absorbent is passed via line 5 into the first reacting zone, zone 6. The amount of rich absorbent passed into zone 6 is ordinarily at least sufficient to remove the net sulfur input into zone 2 from the input gas stream in order to line out the concentration of sulfur in the absorbent stream. In the case under consideration, the amount of the absorbent withdrawn for regeneration via line 5 will be about 0.1 to 10 percent of the rich absorbent stream withdrawn from the bottom of zone 2. It is to be noted that during start-up of scrubbing zone 2, the inventory of the scrubbing solution needed for initiating operation is introduced into the system via line 20, 18 and 4. It is also to be recognized that there is a net water make in the regeneration section of the system due to the reaction of ammonium thiosulfate with hydrogen. At least a portion of the net water product of the present process can be removed from the system in the treated gas stream withdrawn via line 3 if the input gas stream entering the process via line 1 is not saturated with water. If the amount of water withdrawn from the system via line 3 is not sufficient to remove the net water make, a portion of the regenerated absorbent can be removed from the system via line 19 and treated in a conventional manner to separate water therefrom with recycle of recovered alkaline reagent if desired.

The rich absorbent stream introduced into zone 6 via line 5 in the particular case of concern here contains about 8 wt. percent sulfur as a mixture of ammonium sulfite and ammonium bisulfite. It is heated to a temperature of about 65° C. by heating means (not illustrated) prior to passage into zone 6. Zone 6 is a conventional liquid-gas contacting zone designed to effect intimate contact between an ascending gas stream and a descending liquid stream. The rich absorbent stream enters the upper region of zone 6 and flows downwardly to an exit port located in the bottom region of the zone. Also introduced into the lower region of zone 6 is a gas stream containing a mixture of $H_2S$ and $CO_2$. This gas stream flows upwardly through the descending liquid stream to an exit port in the upper region of the zone whereby it is vented from the system via line 22. During start-up of this zone sufficient $H_2S$ is introduced via lines 17 and 15 to initiate the desired reaction; thereafter, a portion of an $H_2S$-containing overhead gas stream, which is produced in a subsequently described stripping step, is passed to zone 6 from zone 14 via line 15. Regardless of the source of the reducing agent charged to zone 6, it is passed thereto in an amount at least sufficient to react about 0.5 moles of $H_2S$ per mole of sulfite charged to zone 6. It is to be noted that amounts of $H_2S$ in excess of this minimum amount can be beneficially utilized because excess $H_2S$ is absorbed at least in part into the liquid stream being treated and this absorbed $H_2S$ will materially aid the reaction occurring in subsequently described zone 8.

Zone 6 is maintained at thiosulfate production conditions which in this particular case are a temperature of about 65° C., a pressure of about 200 psig. and a residence time of the liquid stream in zone 6 of about 0.1 hrs.

An overhead gas stream containing relatively large amounts of $CO_2$ and very minor amounts of $H_2S$ is then withdrawn from zone 6 via line 22 and vented from the system. A liquid effluent stream is withdrawn from the bottom of zone 6 via line 7, heated to a temperature of about 200° C. by heating means (not shown) and charged to the second reaction zone, zone 8. This aqueous effluent stream contains ammonium thiosulfate in an amount corresponding to a conversion in zone 6 of greater than 95 percent of the entering ammonium sulfite and bisulfite to ammonium thiosulfate. Furthermore, the amount of undesirable ammonium sulfate formed by the selective reaction occurring within zone 6 is less than 3 percent of the input sulfite. Thus, the aqueous effluent stream withdrawn from zone 6 principally contains ammonium thiosulfate with minor amounts of unreacted ammonium sulfite and bisulfite and with trace amounts of ammonium sulfate. Because carbon dioxide is used to aid stripping in zone 14, this liquid effluent stream will also contain minor amounts of ammonium carbonate and bicarbonate.

The second reaction zone, zone 8, is another liquid-gas reaction zone designed to affect intimate contact between a concurrently flowing hydrogen-containing gas stream, a liquid stream and a solid bed of a reduction catalyst. The aqueous effluent stream from zone 6 is introduced into the upper region of the zone 8 via line 7. Also introduced into the upper region of the zone 8 is an $H_2$-containing gas stream where enters the zone by means of lines 11 and 7. After start-up of the process, a substantial portion of the necessary hydrogen is recovered from the effluent stream withdrawn from zone 8. During start-up of the process, hydrogen is introduced into zone 8 via lines 12, 11 and 7 in order to provide a circulating inventory of hydrogen which flows around a flow circuit defined by lines 9, 11 and 7. After this inventory is provided, line 12 is utilized to inject makeup hydrogen into the system in order to maintain the desired mole ratio of $H_2$ to thiosulfate within zone 8. Zone 8 contains a catalyst comprising 12 to 20 mesh particles of Darco activated carbon having a cobalt sulfide component combined therewith in an amount sufficient to result in the catalyst containing 2.3 wt. percent cobalt. The catalyst is prepared by a conventional impregnation procedure with a water-soluble compound of cobalt followed by a sulfiding treatment at a relatively low temperature. The total amount of hydrogen introduced into zone 8 corresponds to a hydrogen to ammonium thiosulfate mole ratio of 40:1. The reduction conditions maintained in zone 8 in this particular case are a temperature of 200° C., a pressure of 300 psig. and liquid hourly space velocity of 2 hrs.$^{-1}$ An effluent stream comprising a mixture of liuqid and gas is withdrawn from zone 8 via line 9, cooled to a temperature of about 100° C. by cooling means (not illustrated) and passed into separating zone 10. In zone 10, a hydrogen-rich gas phase separates from a liquid aqueous phase. The gas phase contains unreacted hydrogen, hydrogen sulfide and water vapor; it is withdrawn from zone 10 via line 11 and recirculated through a compressor (not shown) to zone 8. Zone 10 is operated at a pressure which is primarily the same as that utilized in zone 8.

The liquid phase formed in zone 10 is withdrawn therefrom via line 13 and passed to the upper region of stripping zone 14. This liquid stream is the aqueous portion of the effluent stream from zone 8 and it contains ammonium hydrosulfide, unreacted ammonium thiosulfate, ammonium hydroxide, ammonium bicarbonate and a minor amount of ammonium sulfate. An analysis of this aqueous stream indicates that 99 percent of the ammonium thiosulfate charged to zone 8 is converted therein, with 89 percent of this thiosulfate being converted to ammonium hydrosulfide. In addition, the analysis shows that less than 5 percent of the ammonium thiosulfate is converted in zone 8 to the undesired, refractory ammonium sulfate.

In stripping zone 14, the aqueous effluent stream charged thereto is countercurrently contacted with an ascending stripping gas which is introduced in the lower region of zone 14 by means of the line 21. The stripping gas typically comprises a mixture of carbon dioxide and steam. Zone 14 is operated in the conventional manner at a relatively low temperature and pressure as compared to zone 8. The stripping conditions utilized in the particular case illustrated in the drawing are a temperature of about 60° to 100° C. and a pressure of approximately 0 to 30 psig. Zone 14 also typically contains suitable means for effecting intimate contact between a decending liquid stream and an ascending gas stream. Carbon dioxide is especially preferred for use as a stripping gas because it acts as to lower the pH of the liquid stream to the point where $H_2S$ is released from the solution and ammonium carbonate or bicarbonate is formed; it also helps to eliminate problems of $NH_3$ carryovery in the stripping gas stream. In some cases it is a preferred practice to inject into the top of zone 14, a cooled portion of the bottom stream withdrawn therefrom via line 18 in order to minimize $NH_3$ carryover in the overhead gas stream. This is particularly true when the stripping gas is composed primarily of steam or the like gases which do not react with the liberated $NH_3$ as $CO_2$ does. Of course, stripping gas can be generated within zone 14 if desired by using conventional means such as a steam coil or reboiler to heat the liquid in the bottom portion of the zone and to generate upflowing vapors.

An overhead gaseous stream is then withdrawn from zone 14 via line 15 and passed to the junction of line 16 with line 15. The major portion of this overhead stream is then withdrawn from the system via line 16. The gas stream withdrawn via line 16 contains the net sulfide product of the present process and, it can be charged to any suitable process for the recovery of sulfur or the manufacture of sulfuric acid; for example, this stream could be passed to a conventional Claus unit for recovery of sulfur via an oxidation procedure. This overhead gaseous stream contains a relatively large amount of hydrogen sulfide, carbon dioxide and minor amounts of ammonia and water. Another portion of this overhead stream is passed via line 15 to zone 6 in order to supply the hydrogen sulfide reactant necessary for the conversion of sulfite to thiosulfate in zone 6.

A stream of regenerated absorbent is withdrawn from the lower region of zone 14 via line 18 and passed back to zone 2 via lines 18 and 4. This regenerated absorbent stream primarily contains a mixture of ammonium carbonate and bicarbonate with minor amounts of unreacted ammonium thiosulfate, unreacted ammonium sulfite, ammonium hydrosulfide and ammonium sulfate. The total sulfur content of this regenerated absorbent stream is less than 10 percent of the total sulfur content of the rich absorbent stream withdrawn from the scrubbing section of the system via line 5. Moreover, the amount of undesired ammonium sulfate formed in the regeneration section of the system (i.e., the section of the system comprising zones 6, 8, 10 and 14) is less than 3 percent of the sulfite charged to the regeneration section via line 5. Thus the scrubbing process of the present invention enables the continuous scrubbing of $SO_2$ from the gas stream entering the system via line 1 with continous regeneration and recirculation of absorbent in a closed-loop manner. In addition, the amount of undesired ammonium sulfate formed in the regeneration section of the system is held to extremely low levels.

It is intended to cover by the following claims all changes and modifications of the above disclosure of the present invention that would be self-evident to a man of ordinary skill in the gas treating art.

I claim as my invention:

1. A process for treating an input gas stream containing $SO_2$ in order to continuously remove $SO_2$ therefrom, said process comprising the steps of:
   a. contacting the input gas stream with an aqueous absorbent stream containing an alkaline reagent at scrubbing conditions selected to result in a treated gas stream containing a reduced amount of $SO_2$, and in an effluent water stream containing a water-soluble sulfite compound;
   b. reacting at least a portion of the effluent stream from step (a) with a reducing agent selected from the group consisting of finely divided sulfur, a water-soluble sulfide compound, a polysulfide compound and mixtures thereof, at thiosulfate production conditions selected to form an effluent stream containing a thiosulfate compound;
   c. catalytically treating the effluent stream from step (b) with hydrogen at reduction conditions selected to produce a substantially thiosulfate-free aqueous effluent stream containing a sulfide compound;
   d. stripping hydrogen sulfide from the aqueous effluent stream produced in step (c) to form an $H_2S$-containing overhead stream and a regenerated aqueous absorbent stream; and thereafter,
   e. passing at least a portion of the resulting regenerated aqueous absorbent stream to step (a).

2. A process as defined in claim 1 wherein the alkaline reagent is ammonium carbonate or ammonium bicarbonate.

3. A process as defined in claim 1 wherein the alkaline reagent is ammonium hydroxide.

4. A process as defined in claim 1 wherein the alkaline reagent is an alkali metal hydroxide or alkali metal carbonate or alkali metal bicarbonate.

5. A process as defined in claim 4 wherein the alkali metal is sodium.

6. A process as defined in claim 4 wherein the alkali metal is potassium.

7. A process as defined in claim 1 wherein the alkaline reagent is water-soluble alkaline earth metal hydroxide or an alkaline earth metal carbonate or an alkaline earth metal bicarbonate.

8. A process as defined as in claim 1 wherein the thiosulfate production conditons utilized in step (b) include a temperature of about 20° to about 150° C. and a pressure sufficient to maintain the effluent stream from step (a) in the liquid phase.

9. A process as defined in claim 1 wherein the reduction conditions utilized in step (c) include a temperature of about 125° to about 350° C. and a pressure sufficient to maintain the effluent stream from step (b) in the liquid phase.

10. A process as defined in claim 1 wherein the amount of hydrogen charged to step (c) is sufficient to provide a mole ratio of hydrogen to thiosulfate passed thereto of at least 4:1.

11. A process as defined in claim 1 wherein the reducing agent utilized in step (b) is hydrogen sulfide.

12. A process as defined in claim 11 wherein at least a portion of the hydrogen sulfide utilized in step (b) is obtained by passing to step (b) a portion of the $H_2S$-containing overhead stream formed in step (d).

13. A process as defined in claim 1 wherein the reducing agent utilized in step (b) is finely divided sulfur which is used in an amount at least sufficient to provide a mole ratio of sulfur to sulfite of 1:1.

14. A process as defined in claim 1 wherein the reducing agent utilized in step (b) is a polysulfide compound which is used in an amount at least sufficient to provide a mole ratio of polysulfide to sulfite of 1:6.

15. A process as defined as in claim 1 wherein the reducing agent utilized in step (b) is a water-soluble sulfide compound which is used in an amount at least sufficient to provide a mole ratio of sulfide to sulfite in this step of 1:2.

16. A process as defined as in claim 1 wherein step (c) comprises contacting the effluent stream from step (b) and a hydrogen stream with a reduction catalyst, comprising a combination of a catalytically effective amount of a metallic component, selected from the group consisting of the transition metals and compounds of groups VI and VIII of the Periodic Table, with a porous carrier material, at reduction conditions selected to form a substantially thiosulfate-free aqueous effluent stream containing a sulfide compound.

17. A process as defined in claim 16 wherein the metallic component of the reduction catalyst is selected from the metal and compounds of the iron group metals.

18. A process as defined in claim 17 wherein the iron group metallic component is cobalt.

19. A process as defined in claim 18 wherein the reduction catalyst comprises a catalytically effective amount of cobalt sulfide combined with activated carbon or alumina carrier material.

20. A process for treating an input gas stream containing $SO_2$ in order to continuously remove a substantial portion of the $SO_2$ therefrom, said process comprising the steps of:
  a. contacting the input gas stream with an aqueous absorbent stream containing ammonium hydroxide or carbonate at scrubbing conditions selected to form a treated gas stream containing a reduced amount of $SO_2$ and an effluent water stream containing ammonium sulfite or ammonium bisulfite;
  b. reacting at least a portion of the effluent water stream from step (a) with a reducing agent selected from the group consisting of finely divided sulfur, a polysulfide compound, a water-soluble sulfide compound and mixtures thereof, at thiosulfate production conditions selected to result in an effluent stream containing ammonium thiosulfate;
  c. catalytically treating the effluent stream from step (b) with hydrogen at reduction conditions selected to form a substantially thiosulfate-free aqueous effluent stream containing ammonium sulfide or hydrosulfide;
  d. stripping hydrogen sulfide from the aqueous effluent stream from step (c) to form an $H_2S$-containing overhead gas stream and a regenerated aqueous absorbent stream containing ammonium hydroxide or carbonate; and thereafter,
  e. passing at least a portion of the resulting regenerated absorbent stream to step (a).

21. A process as defined in claim 20 wherein hydrogen is charged to step (c) in an amount corresponding to a mole ratio of hydrogen to thiosulfate passed thereto of about 4:1 to about 100:1.

22. A process as defined in claim 20 wherein the reducing agent utilized in step (b) is hydrogen sulfide.

23. A process as defined in claim 22 wherein at least a portion of the hydrogen sulfide reactant utilized in step (b) is obtained by passing a portion of the overhead stream produced in step (d) to step (b).

24. A process as defined in claim 20 wherein step (c) comprises contacting the effluent stream from step (b) and a hydrogen stream with a catalyst, comprising a combination of a catalytically effective amount of cobalt sulfide with a porous carrier material, at reduction conditions selected to form a substantially thiosulfate-free aqueous effluent stream containing ammonium hydrosulfide.

* * * * *